(12) United States Patent
Thompson et al.

(10) Patent No.: US 10,118,278 B2
(45) Date of Patent: Nov. 6, 2018

(54) RATCHET WRENCH INCLUDING RETAINING RING

(71) Applicant: Snap-on Incorporated, Kenosha, WI (US)

(72) Inventors: Christopher D Thompson, Franklin, WI (US); Daniel M Eggert, Kenosha, WI (US); David T Ross, Beach Park, IL (US)

(73) Assignee: Snap-on Incorporated, Kenosha, WI (US)

( * ) Notice: Subject to any disclaimer, the term of this patent is extended or adjusted under 35 U.S.C. 154(b) by 464 days.

(21) Appl. No.: 14/698,328

(22) Filed: Apr. 28, 2015

(65) Prior Publication Data

US 2015/0328749 A1 Nov. 19, 2015

Related U.S. Application Data

(60) Provisional application No. 61/993,850, filed on May 15, 2014.

(51) Int. Cl.
| | |
|---|---|
| *B25B 13/46* | (2006.01) |
| *B25B 13/04* | (2006.01) |
| *B25B 13/08* | (2006.01) |
| *F16D 41/16* | (2006.01) |

(52) U.S. Cl.
CPC ............ *B25B 13/463* (2013.01); *B25B 13/04* (2013.01); *B25B 13/08* (2013.01); *F16D 41/16* (2013.01)

(58) Field of Classification Search
CPC ............................ B25B 13/463; B25B 13/462
USPC .......................................... 81/63.1, 62, 63.2
See application file for complete search history.

(56) References Cited

U.S. PATENT DOCUMENTS

| | | | |
|---|---|---|---|
| 3,436,992 A | 4/1969 | Over et al. |
| 5,199,330 A | 4/1993 | Arnold et al. |
| 5,467,672 A | 11/1995 | Ashby |
| 5,901,620 A | 5/1999 | Arnold |
| 6,230,591 B1 | 5/2001 | Ling et al. |

(Continued)

FOREIGN PATENT DOCUMENTS

| | | |
|---|---|---|
| CN | 101293340 A | 10/2008 |
| CN | 101678436 A | 3/2010 |

(Continued)

OTHER PUBLICATIONS

United Kingdom Intellectual Property Office Combined Search and Examination Report Under Sections 17 and 18(3), dated Oct. 12, 2015; 7 pages.

(Continued)

*Primary Examiner* — David B Thomas
(74) *Attorney, Agent, or Firm* — Seyfarth Shaw LLP

(57) ABSTRACT

A tool including a wrench body having a first drive end at a first end of the wrench body, and an aperture in the first drive end that includes a shoulder or retaining web extending into the aperture. A ratchet gear including a receiving portion adapted to engage a work piece for providing torque to the work piece, and a ring groove is disposed in the aperture with the receiving portion and the ring groove on opposite sides of the shoulder. A retaining ring is disposed in the ring groove and adapted to retain the ratchet gear in the aperture. The retaining ring limits offset loading that may be applied to a cover plate and/or retention screws when the tool is being used.

15 Claims, 10 Drawing Sheets

(56) References Cited

U.S. PATENT DOCUMENTS

| | | |
|---|---|---|
| 6,408,722 B1 | 6/2002 | Chen |
| 6,431,031 B1 | 8/2002 | Hu |
| 6,457,387 B1 | 10/2002 | Hu |
| 6,568,299 B2 | 5/2003 | Hu |
| 6,691,594 B2 | 2/2004 | Chen |
| 6,955,104 B2 | 10/2005 | Hu |
| 6,971,285 B2 * | 12/2005 | Chen ............... B25B 13/463 81/177.85 |
| 6,981,434 B2 | 1/2006 | Chen |
| 7,073,412 B1 | 7/2006 | Arnold |
| 7,111,527 B1 * | 9/2006 | Lee ............... B25B 13/463 81/58.1 |
| 7,143,669 B2 | 12/2006 | Hu |
| 7,287,448 B2 | 10/2007 | Hu |
| 7,299,720 B1 | 11/2007 | Schultz et al. |
| 7,421,772 B2 | 9/2008 | Gao et al. |
| 7,661,337 B2 | 2/2010 | Chen |
| 7,987,747 B2 * | 8/2011 | Ross ............... B25B 13/463 81/62 |
| RE42,768 E | 10/2011 | Huang |
| 8,210,073 B2 | 7/2012 | Hu |
| 8,245,602 B2 | 8/2012 | Chan |
| 8,250,947 B2 | 8/2012 | Hu |
| 8,297,152 B2 * | 10/2012 | Hu ............... B25B 13/463 81/63.1 |
| 8,499,666 B2 | 8/2013 | Hopper et al. |
| 8,683,894 B1 | 4/2014 | Chen |
| 2001/0054531 A1 | 12/2001 | Chang |
| 2004/0016322 A1 | 1/2004 | Hu |
| 2004/0055423 A1 | 3/2004 | Hu |
| 2004/0200321 A1 | 10/2004 | Chen |
| 2004/0261584 A1 * | 12/2004 | Huang ............... B25B 13/463 81/63.1 |
| 2005/0011315 A1 | 1/2005 | Chen |
| 2005/0257650 A1 | 11/2005 | Hu |
| 2006/0117913 A1 | 1/2006 | Chen |
| 2006/0065078 A1 | 3/2006 | Chen et al. |
| 2008/0229887 A1 * | 9/2008 | Thompson ............ B25B 13/463 81/62 |
| 2010/0018356 A1 | 1/2010 | Hu |
| 2012/0060652 A1 | 3/2012 | Gapp et al. |
| 2013/0269488 A1 | 10/2013 | Huang |
| 2013/0283982 A1 | 10/2013 | Hopper et al. |

FOREIGN PATENT DOCUMENTS

| | | |
|---|---|---|
| DE | 202012007004 U | 11/2012 |
| DE | 202013103841 U1 | 10/2013 |
| EP | 1862260 | 12/2007 |
| GB | 584232 A | 1/1947 |
| GB | 2387135 | 10/2003 |
| GB | 2448405 A | 4/2012 |
| TW | 267962 | 1/1996 |
| TW | 356439 | 4/1999 |
| TW | 363911 | 7/1999 |
| TW | 200914210 | 4/2009 |
| TW | 201103707 | 2/2011 |

OTHER PUBLICATIONS

United Kingdom Intellectual Property Combined Search and Examination Report under Sections 17 and 18(3), dated Oct. 16, 2015; 7 pages.
Canadian Examiners Report dated Sep. 8, 2016; 5 pages.
UK Examiner's Report dated Nov. 16, 2016; 4 pages.
State Intellectual Property Office P. R. China, Office Action dated Jun. 20, 2016; 11 pages.
Taiwan Office Action dated Oct. 21, 2015; 9 pages.
Australian Government Patent Examination Report No. 1, dated Dec. 17, 2015; 5 pages.
Taiwan Office Action for Application No. 104115499, dated Aug. 31, 2017, 11 pages.
Chinese Office Action for Application No. 201510244796.X dated Sep. 11, 2017, 9 pages.
Chinese Office Action for Application No. 201510244797.4 dated Dec. 27, 2017, 7 pages.
Australian Examination Report for Application No. 2016277550 dated Feb. 1, 2018, 4 pages.

* cited by examiner

RATCHET WRENCH INCLUDING RETAINING RING

CROSS REFERENCES TO RELATED APPLICATIONS

The present application claims the benefit of U.S. Provisional Patent Application Ser. No. 61/993,850, filed May 15, 2014, entitled Low Profile Ratchet Wrench, the contents of which is incorporated herein by reference in its entirety.

FIELD

The present invention relates generally to ratchet mechanisms. More particularly, the present invention relates to improved ratchet wrench devices and methods.

BACKGROUND

Reversible ratchet mechanisms, such as ratchet wrenches, are well-known and used. Typically there is a drive portion engageable with a work piece, for example, a bolt head. In general, a first rotational drive direction may be selected for the ratchet mechanism so that use of the tool applies torque when engaged with the bolt head and rotated in a first direction, while slipping or ratcheting when rotated in an opposing, second direction. A second rotational drive direction may be selected for the ratchet mechanism that is opposite the first drive direction, which then provides torque in the second direction, while slipping or ratcheting when rotated in the opposite first direction.

In conventional low-profile ratchet wrenches, torqueing a ratchet at an angle tends to apply a concentrated load on a cover plate of the wrench. This load can cause screws, which retain the cover plate in place, to fail, reducing the reliability and durability of such wrenches.

SUMMARY

The present invention relates to a tool, such as a ratchet wrench. In an embodiment, the tool includes a ratchet gear. The ratchet gear includes a substantially circular body portion having a receiving portion formed therein, ratchet teeth on an outer circumferential surface of the substantially circular body portion, an engagement surface surrounding the receiving portion and adapted to operatively engage a working piece, and a ring groove proximal to an end of the substantially circular body portion and adapted to receive a retaining ring to retain the ratchet gear in a tool. This limits offset loading that may be applied to a cover plate and/or retention screws when the tool is being used. This also limits offset of the ratchet gear and allows for a low profile outer diameter of the tool for low clearance applications.

An embodiment of the present invention broadly comprises a tool including a first drive end at a first end of the tool. An aperture is formed in the first drive end and includes a shoulder extending therein. A ratchet gear including a receiving portion adapted to engage a work piece, such as a bolt head, for providing torque to the working piece and a ring groove is disposed in the aperture with the receiving portion and the ring groove on opposing sides of the shoulder. A retaining ring is disposed in the ring groove and adapted to cooperatively retain the ratchet gear in the aperture.

Another embodiment of the present invention broadly includes a ratcheting tool having a first drive end at a first end of the tool. The first drive end includes an aperture including a shoulder extending therein, a first cavity adjacent to and communicating with the aperture, a second cavity adjacent to and communicating with the first cavity, and a throughbore in the second cavity. A ratchet gear including a receiving portion adapted to engage a work piece for providing torque to the work piece and a ring groove is disposed in the aperture with the receiving portion and the ring groove on opposing sides of the shoulder. A retaining ring is disposed in the ring groove and adapted to cooperatively retain the ratchet gear in the aperture.

The tool may further include first and second pawls including respective pawl posts. The first and second pawls are disposed in the first cavity and adapted to selectively engage the ratchet gear. A first spring is disposed between the first and second pawls and adapted to bias the first and second pawls apart. A second spring is also disposed in the first cavity and engaged with relief portions of the first and second pawls. The second spring limits movement of the first and second pawls away from the ratchet gear during use of the tool.

A reversing lever having a stem portion is disposed in the throughbore and extends into the second cavity for causing selective engagement of the first and second pawls with the ratchet gear. A reversing disc is disposed in the second cavity and engaged with the stem portion. The reversing disc includes hook portions adapted to engage the pawl posts, and the reversing lever is adapted to rotate the reversing disc to select either one of first and second opposing rotational drive directions. In the first rotational drive direction, the reversing disc engages the post of the first pawl to disengage the first pawl from the ratchet gear, and the second pawl engages the ratchet gear. In the second rotational drive direction, the reversing disc engages the post of the second pawl to disengage the second pawl from the ratchet gear, and the first pawl engages the ratchet gear. A cover plate may also be disposed on the first drive end and cover the first and second cavities.

BRIEF DESCRIPTION OF THE DRAWINGS

For the purpose of facilitating an understanding of the invention, there are illustrated in the accompanying drawings embodiments thereof, from an inspection of which, when considered in connection with the following description, the invention, its construction and operation, and many of its advantages should be readily understood and appreciated.

DETAILED DESCRIPTION

Figure 1:
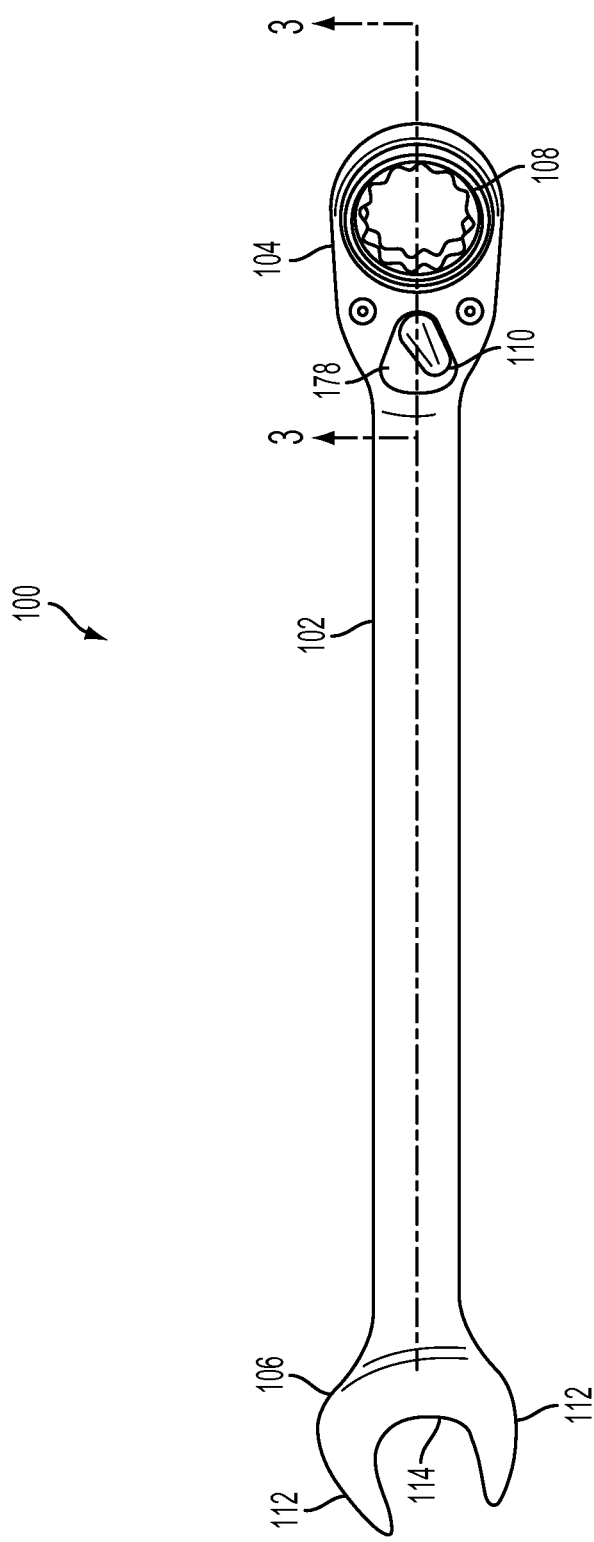
FIG. 1 is a plan view of a ratchet wrench according to an embodiment of the present invention.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

Embodiments of the present invention broadly comprises a tool, such as a low-profile ratchet wrench. The ratchet wrench adds a ring groove to an end of the ratchet gear, and a retaining web or shoulder in the head of the ratchet wrench. A retaining ring is disposed in the retaining groove to trap the ratchet gear between the retaining ring and the retaining web. This limits offset loading that may be applied to a cover plate and/or retention screws when the ratchet wrench is being used. This also limits offset of the ratchet gear and allows for a low profile outer diameter of the ratchet wrench for low clearance applications.

Referring to FIG. 1, a tool 100 includes a wrench body or handle 102, a first drive end 104 at a first end of the handle 102, and a second drive end 106 at a second end of the handle opposite the first end. Each of the first drive end 104 and the second drive end 106 is adapted to engage a work piece (not shown), such as a bolt or nut, for providing torque to the work piece. In another embodiment, the tool includes just first drive end 104.

The first drive end 104 is of a ratcheting type and includes a ratchet gear 108 and a reversing lever 110 allowing a user to selectively determine a torque application direction. More specifically, the ratchet gear 108 is operatively engageable with a work piece. When the reversing lever 110 is in a first position, torque drive is permitted with rotation of the ratchet gear 108 in a first rotational drive direction, while slippage or ratcheting occurs with rotation of the ratchet gear 108 in a second rotational drive direction opposite the first. Conversely, when the reversing lever 110 is in a second position, torque drive is permitted with rotation of the ratchet gear 108 in the second rotational drive direction, while slippage or ratcheting occurs in the first rotational drive direction.

In an embodiment, the second drive end 106 is of an open-ended wrench type. As illustrated, the second drive end 106 includes arms 112 that form a receiving portion 114 adapted to releasably engage a work piece, and to transmit torque from the tool 100 to the work piece. It should be appreciated that while the present tool is depicted as having an open ended box wrench on one end and a ratchet wrench on the other end, other configurations of the present application can be used without departing from the spirit and scope of the present application, such as, for example, having ratchet wrenches on both the first and second ends of the handle 102.

Figure 2:
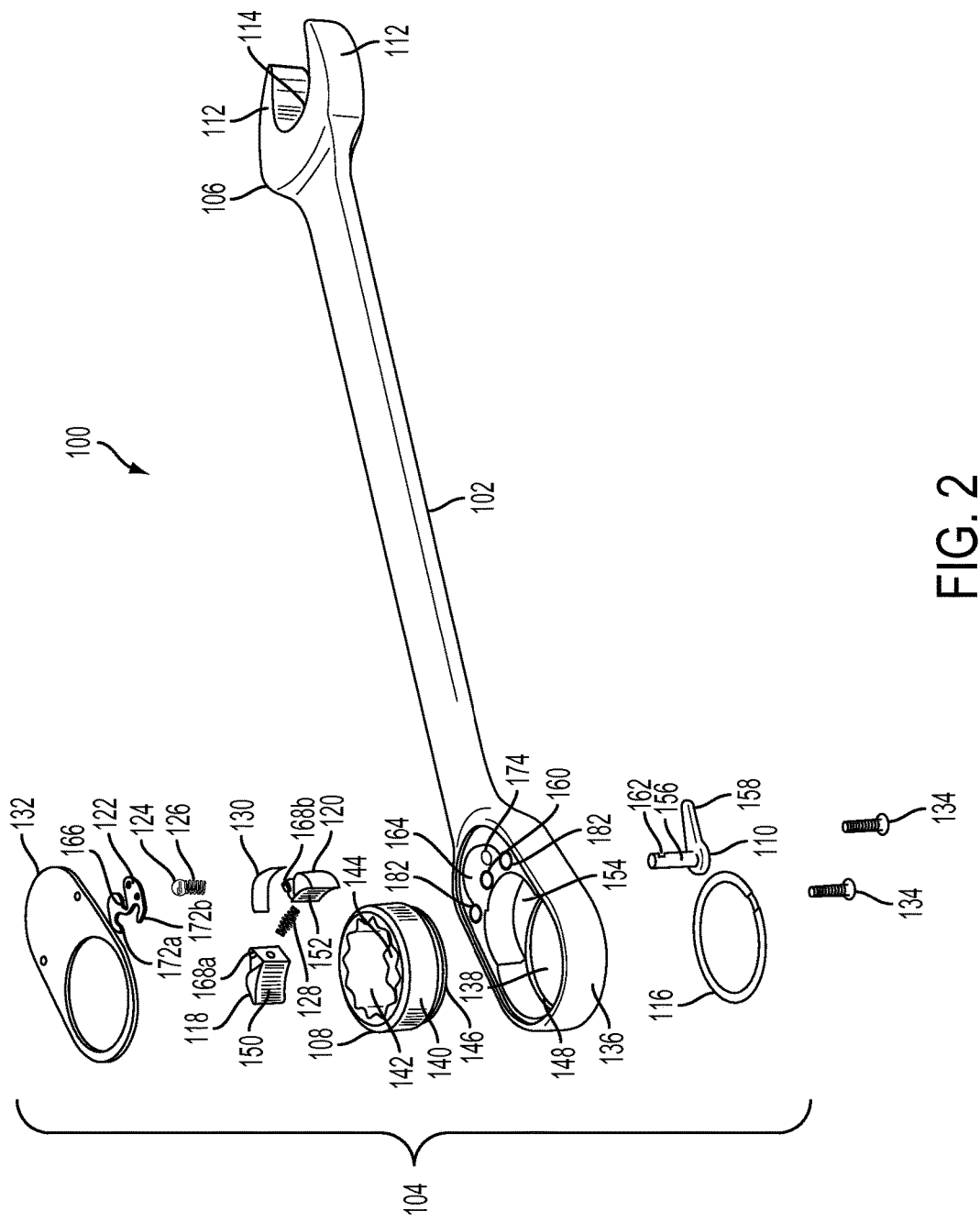
FIG. 2 is an exploded perspective view of the ratchet wrench of FIG. 1.

Referring to FIG. 2, the first drive end 104 includes a number of components that, when assembled, form the first drive end 104. The components include, for example, the ratchet gear 108, the reversing lever 110, a retaining ring 116, pawls 118, 120, a reversing disc 122, a ball 124 and spring 126, a first spring 128 and a second spring 130, and a cover plate 132 and fasteners 134. The first drive end 104 also includes a head portion 136 including an aperture 138 and one or more cavities for receiving and retaining one or more of the components.

Figure 3:
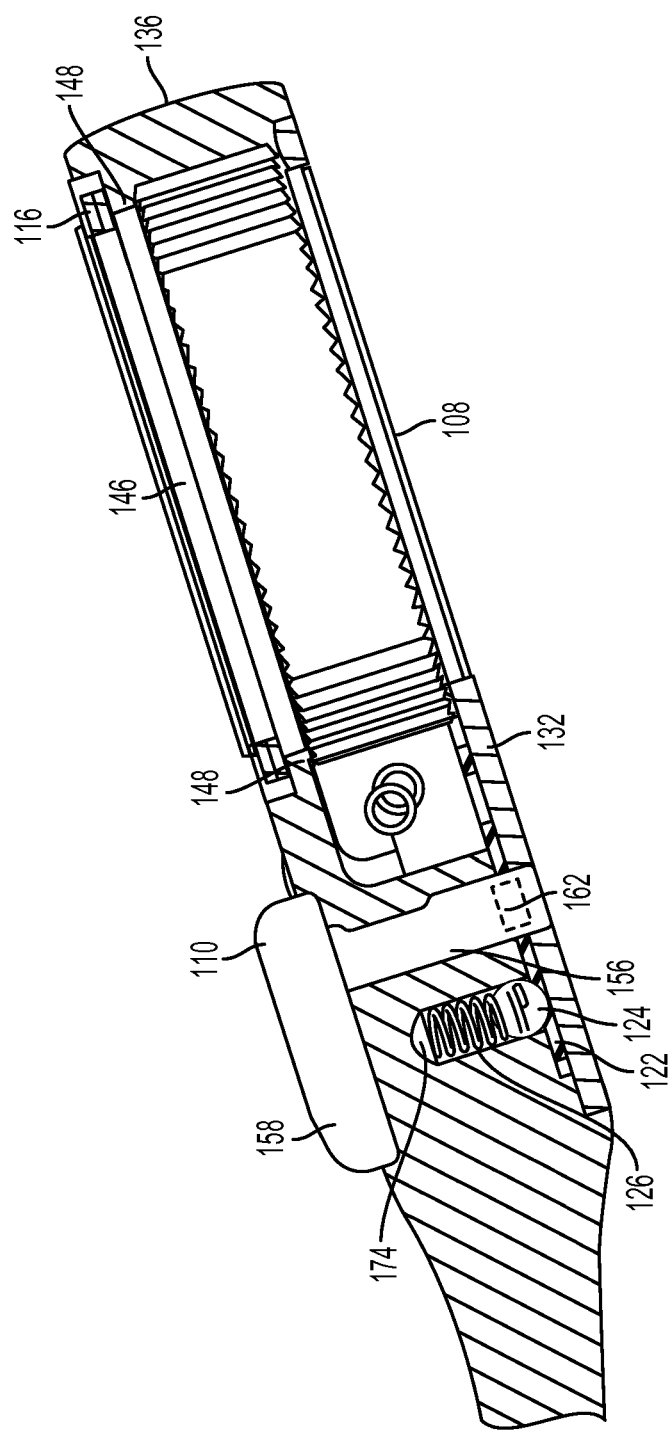
FIG. 3 is an enlarged, cross-sectional view of the ratchet wrench of FIG. 1, taken along line 3-3 of FIG. 1.

The ratchet gear 108 has a generally circular body portion with ratchet gearing or teeth 140 on an outer circumferential surface, and engagement surfaces 142 surrounding a receiving portion or receiving aperture 144 adapted to operatively engage a work piece. Referring to FIGS. 2 and 3, the ratchet gear 108 also includes a ring groove 146 proximal to an end of the ratchet gear and adapted to receive the elastic retaining ring 116. The ratchet gear 108 is disposed in the aperture 138, with the ring groove 146 extending past a retaining web or shoulder 148 in the aperture 138 and the ratchet gearing or teeth 140 remaining in the aperture 138. In this aspect, the retaining web 148 and retaining ring 116 cooperatively hold the ratchet gear 108 in the aperture 138.

When traditional ratchet wrenches are loaded at an angle, other than perpendicular to an axis of rotation, the ratchet gear tends to tilt. This causes a load to be applied to the cover plate of the wrench, which in turn applies a load on the retention screws holding the cover plate on the wrench and causing the retention screws to stress or fail. Embodiments of the present invention solve this problem by trapping the ratchet gear 108 with the retaining web 148 and retaining ring 116. The retaining web 148 and retaining ring 116 prevent the ratchet gear 108 from applying a load to the cover plate 132 and fasteners 134 during use.

In an embodiment, the tool 100 has an improved fatigue strength and rigidity as compared to traditional ratchet wrenches of the type. The tool 100 improves the strength and rigidity by orienting the pawls 118, 120 to minimize a depth of one or more of the cavities in the head portion 136, as described in further detail below.

Figure 4:
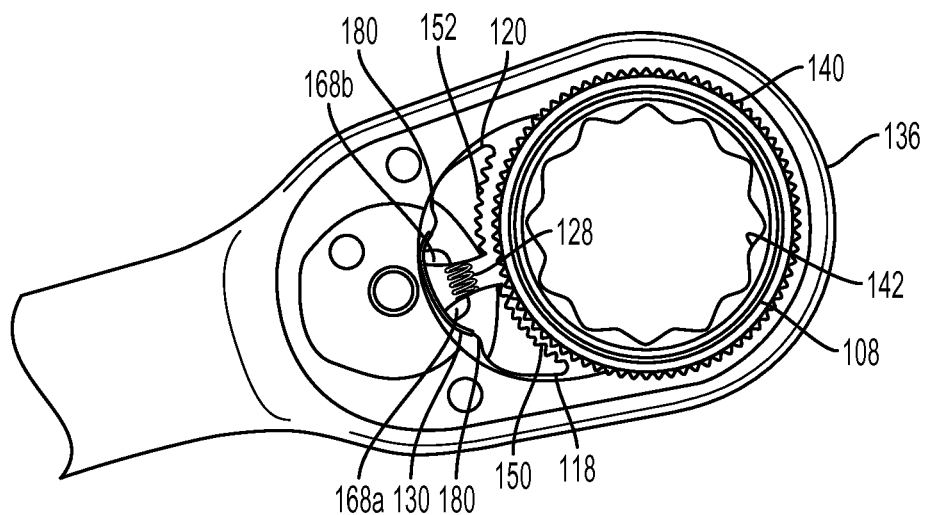
FIG. 4 is a first plan view of the ratchet wrench of FIG. 1, with a cover plate removed.

Referring to FIGS. 2 and 4, the pawls 118, 120 respectively include teeth 150, 152, adapted to matingly engage the ratchet gearing or teeth 140 of the ratchet gear 108 to allow torque to be applied in a selected direction. The pawls 118, 120 are disposed in a cavity 154 adjacent to and communicating with the aperture 138 to allow the pawls 118, 120 to selectively move into and out of engagement with the ratchet gearing or teeth 140 of the ratchet gear 108. A bias member, such as the first spring 128, is disposed between the pawls 118, 120. The ends of the first spring 128 are received and retained by a bore formed in a side of each pawl 118, 120, the respective bores of the two pawls 118, 120 being in an opposed orientation to allow the first spring 128 to bias the pawls 118, 120 away from each other while also ensuring that only one of the pawls 118, 120 is in engagement with the ratchet gear 108 at a time.

Referring to FIGS. 2 and 3, the reversing lever 110 and reversing disc 122 allow for selective engagement and disengagement of the pawls 118, 120 with the ratchet gear 108. The reversing lever 110 includes a stem portion 156 and a lever portion 158. The stem portion 156 is received in a throughbore 160 provided in the head portion 136 with the lever portion 158 positioned on an outside of the head portion 136 for manual operation by a user to select a desired rotational drive direction. The reversing lever 110 also includes a notch 162 in the stem portion 156 for receiving the reversing disc 122.

Figure 5:
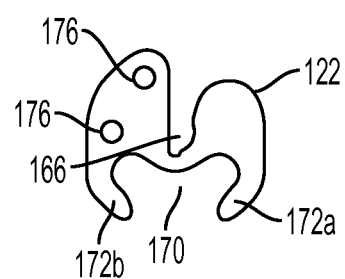
FIG. 5 is a top view of a reversing lever disc of the ratchet wrench of FIG. 1, removed from the wrench for illustration purposes.

The reversing disc 122 is disposed in a cavity 164 and in engagement with the notch 162 of the stem portion 156 extending into the cavity 164. As illustrated, the cavity 164 has a depth less than the cavity 154, and is adjacent to and communicates with the cavity 154 to allow the reversing disc 122 to interact with the pawls 118, 120. Referring to FIGS. 2, and 5, the reversing disc 122 has an irregular channel 166 allowing the reversing disc 122 to be slid into the notch 162 and rotated onto the stem portion 156. In this manner, the reversing lever 110 and the reversing disc 122 co-rotate when the reversing lever 110 is moved between positions for selecting the rotational drive direction.

Figure 6:
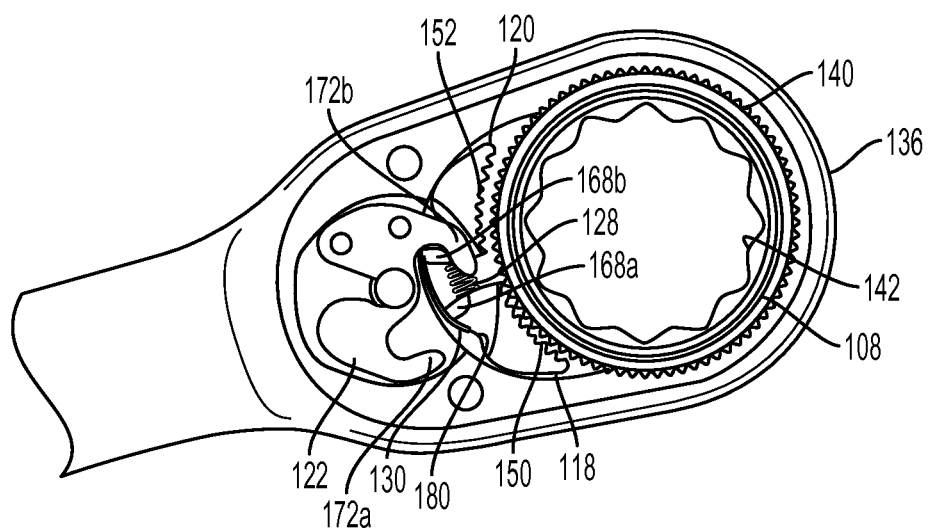
FIG. 6 is a second plan view of the ratchet wrench of FIG. 1, with the cover plate removed.

Referring to FIGS. 2, 4 and 6, the pawls 118, 122 respectively include post 168a, 168b adapted to engage with the reversing disc 122. The posts 168a, 168b of the pawls 118, 122 are proximate an opening of the cavity 154 and oriented to face in a direction of the cover plate 132 or bottom of the head portion 136. This allows the depth of the cavity 164 that receives the reversing disc 122 to be minimized; i.e., to be only deep enough to accommodate the reversing disc 122. Minimizing the depth of the cavity 164 stiffens the head portion 136 improving the strength, rigidity, and the fatigue life of the tool 100.

Referring to FIGS. 2 and 5, the reversing disc 122 includes an arcuate opening 170 defining disc hooks 172a, 172b adapted to respectively engage the posts 168a, 168b. Referring to FIG. 6, as the reversing disc 122 is shifted to a position for a selected drive direction, a first hook 172b engages a first post 168b of, for example, the pawl 120, and continued rotation of the reversing disc 122 draws the pawl 120 away from and out of engagement with the ratchet gear 108. At the same time, a second hook 172a allows the post 168a to move through the opening 170 so that the pawl 118 shifts and becomes engaged with the ratchet gear 108.

A bias member, such as a coil spring 128, biases the pawls 118, 120 away from each other and toward singular engagement with the ratchet gear 108. In this manner, when the reversing disc 122 engages selector post 168a of pawl 118 to move the pawl 118, the spring 128 causes the other pawl 120 to shift position. Likewise, when the reversing disc 122 engages selector post 168b of pawl 120, the spring 128 cause the other pawl 118 to shift position. Additionally, the spring 128 allows the pawl 118, 120 engaged with the ratchet gear 108 to cam or deflect away from the ratchet gear 108 when a first rotational drive direction is selected but the ratchet tool is rotated in reverse, in an opposite direction, to allow slippage or ratcheting in the reverse direction. The spring 128 then forces the pawl 118, 120 to return to engagement with the ratchet gear 108 when the reverse movement ceases.

In an embodiment, referring to FIGS. 2 and 3, a ball and detent structure is provided to assist in holding the reversing disc 122 in place. In this embodiment, a blind bore 174 is located in the cavity 164. The spring 126 is disposed in the bore 174 and the ball 124 is disposed on the spring 126, proximate an opening of the bore 174. As illustrated in FIG. 5, the reversing disc 122 includes corresponding first and second detents or bores 176 on a side of the reversing disc 122 facing the cavity 164. The detents 176 are positioned to correspond to the proper position for the ball 124 when the reversing lever 110 is in the proper position for the first and second rotational drive directions. Referring to FIG. 3, as the reversing lever 110 is rotated out of a position for a drive direction, the ball 124 contacts an edge of one of the detents 176, thereby being deflected downwardly by compression of the spring 126. When the reversing lever 110 is shifted to the proper position for a drive direction, the ball 124 shifts into alignment with one of the detents 176, and the spring 126 biases the ball 124 into the detent 176.

In this embodiment, a stop mechanism is provided by structure formed on the tool 100 to limit over-travel or over-rotation of the reversing lever 110. For example, a recess 178 is formed on an exterior of the tool 100. The recess 178 receives the lever portion 158 of the reversing lever 110. The recess 178 is shaped to prevent over rotation of the reversing lever 110 and the reversing disc 122. Rotation of the reversing lever 110, and thereby the reversing disc 122, to a first position for a first drive direction results in the reversing lever 110 contacting a first edge of the recess 178 (as illustrated in FIG. 1), and rotation of the reversing lever 110 from the first position to a second position for a second drive direction results in the reversing lever 110 contacting a second edge of the recess 178. The stop mechanism may also be provided by structure formed on the reversing disc and the cavity, as described below with reference to tool 200.

In an embodiment, the tool 100 also provides a means to limit pawl travel during use of the tool 100. Referring to FIGS. 2 and 4, the second spring 130 is disposed in the cavity 154 and in engagement with relief portions 180 of the pawls 118, 120. As illustrated in FIG. 4, the relief portions 180 are located on a side of the pawls 118, 120 opposite the respective teeth 150, 152. The second spring 130 biases the pawls 118 and 120 in a direction toward the ratchet gear 108 and restricts travel of the pawls 118 and 120 during a ratcheting operation. This also increases the minimum ratchet travel between loading.

Referring to FIG. 2, the tool 100 may be assembled by disposing the ratchet gear 108 in the aperture 138, with the ring groove 146 extending planarly beyond the retaining web 148. The retaining ring 116 is disposed in the ring groove 146 to hold the ratchet gear 108 in the aperture 138 and prevent the ratchet gear 108 from applying force to the cover plate 132 and fasteners 134 during use. The pawls 118, 120 are disposed in the cavity 154, with the respective teeth 150, 152 facing in a direction of the ratchet gear 108. The spring 128 is disposed between the pawls 118, 120 to bias the pawls 118, 120 apart. The spring 128 may be disposed between the pawls 118, 120 prior to or after disposing the pawls 118, 120 in the cavity 154. The second spring 130 is also disposed in the cavity 154 and engaged with the relief portions 180 of the pawls 118, 120 to limit pawl travel during ratcheting or use of the tool 100.

The reversing lever 110 is disposed in the throughbore 160, with the stem portion 156 and notch 162 extending into the cavity 164 and the lever portion 158 remaining on an exterior surface of the tool 100 in the recess 178. The spring 126 and the ball 124 are inserted into the blind bore 174 in the cavity 164, with the ball 124 proximate the opening of the blind bore 174. The reversing disc 122 is then positioned in the cavity 164 and assembled onto the stem portion 156 by engaging the channel 166 with the notch 162 of the stem portion 156. The reversing disc 122 is rotated and a hook 172a or 172b is disposed around one of the pawl posts 168a or 168b. The cover plate 132 is then coupled on the tool 100 by inserting the fasteners 134 into fastener apertures 182 and coupling the fasteners 134 to the cover plate 132.

Figure 7:
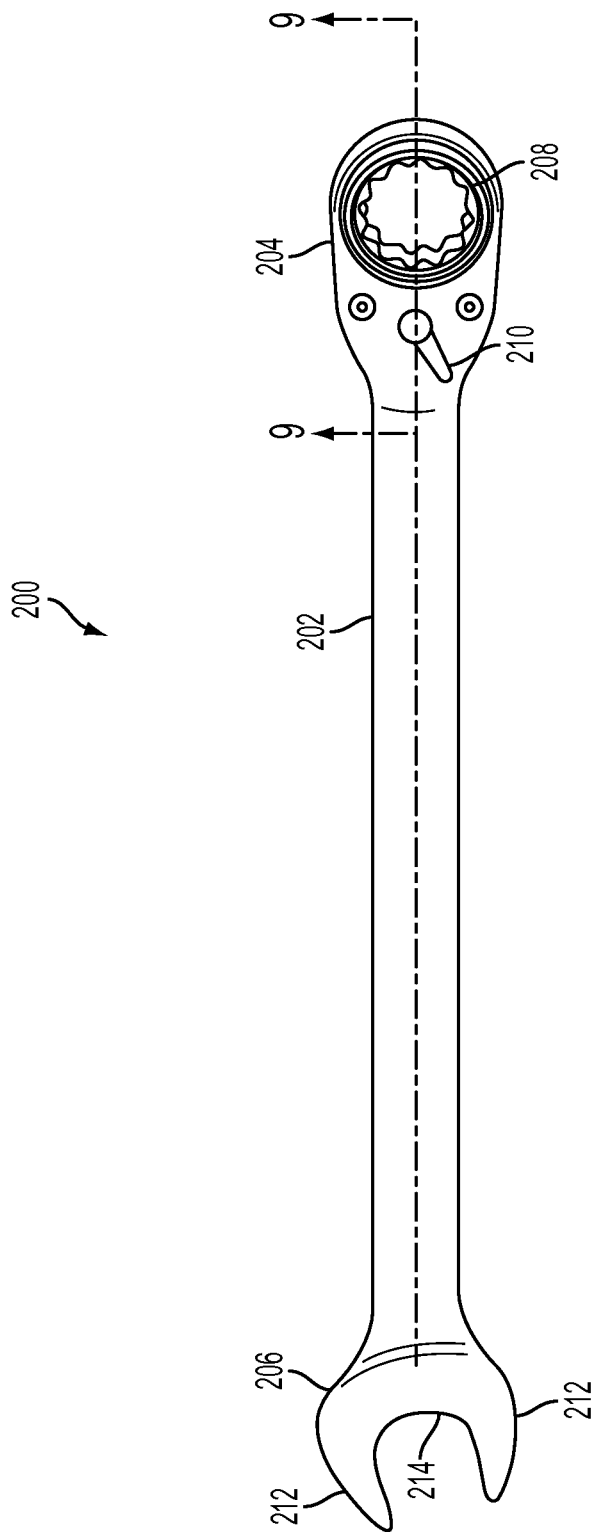
FIG. 7 is a plan view of a ratchet wrench according to another embodiment of the present invention.

In another embodiment, a tool 200 is described with reference to FIG. 7. The tool 200 is similar to the tool 100, described above, and operates and functions in a similar manner. For example, the tool 200 includes a wrench body or handle 202, a first drive end 204 at a first end of the handle 202, and a second drive end 206 at a second end of the handle. As described above with reference to the tool 100, the first drive end 204 and the second drive end 206 are similarly adapted to engage with a work piece for providing torque to the work piece. In another embodiment, the tool 200 includes just first drive end 204.

As illustrated, the first drive end 204 is of a ratcheting type and includes a ratchet gear 208 and a reversing lever 210 allowing a user to selectively determine a torque application direction. The ratchet gear 208 is operatively engageable with a work piece. When the reversing lever 210 is in a first position, torque drive is permitted with rotation of the ratchet gear 208 in a first rotational drive direction, while slippage or ratcheting occurs with rotation of the ratchet gear 208 in a second rotational drive direction opposite the first. Conversely, when the reversing lever 210 is in a second position, torque drive is permitted with rotation of the ratchet gear 208 in the second drive direction, while slippage or ratcheting occurs in the first drive direction.

The second drive end 206 is of an open-ended wrench type and includes arms 212 that form a receiving portion 214 adapted to releasably engage a workpiece. However, it should be appreciated that other configurations of the present invention can be used without departing from the spirit and scope of the present application, such as, for example, having ratchet wrenches on both the first and second ends of the handle 202.

Figure 8:
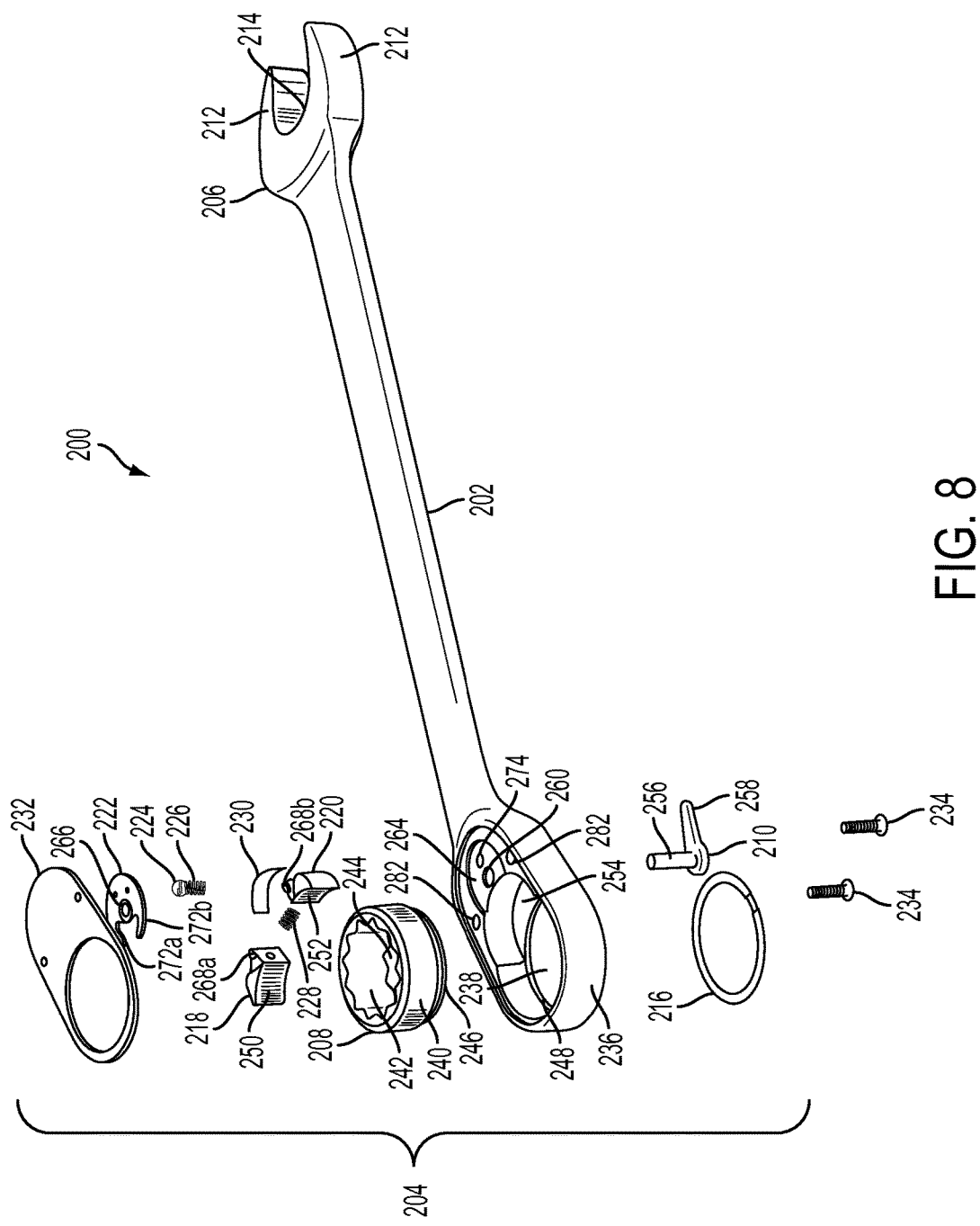
FIG. 8 is an exploded, perspective view of the ratchet wrench of FIG. 7.

As illustrated in FIG. 8, the first drive end 204 includes a number of components that, when assembled, form the first drive end 204. The components include, for example, the ratchet gear 208, the reversing lever 210, a retaining ring 216, pawls 218 and 220, a reversing disc 222, a ball 224 and spring 226, a first spring 228 and a second spring 230, and a cover plate 232 and fasteners 234. The first drive end 204 also includes a head portion 236 including an aperture 238 and one or more cavities for receiving and retaining one or more of the components.

Figure 9:
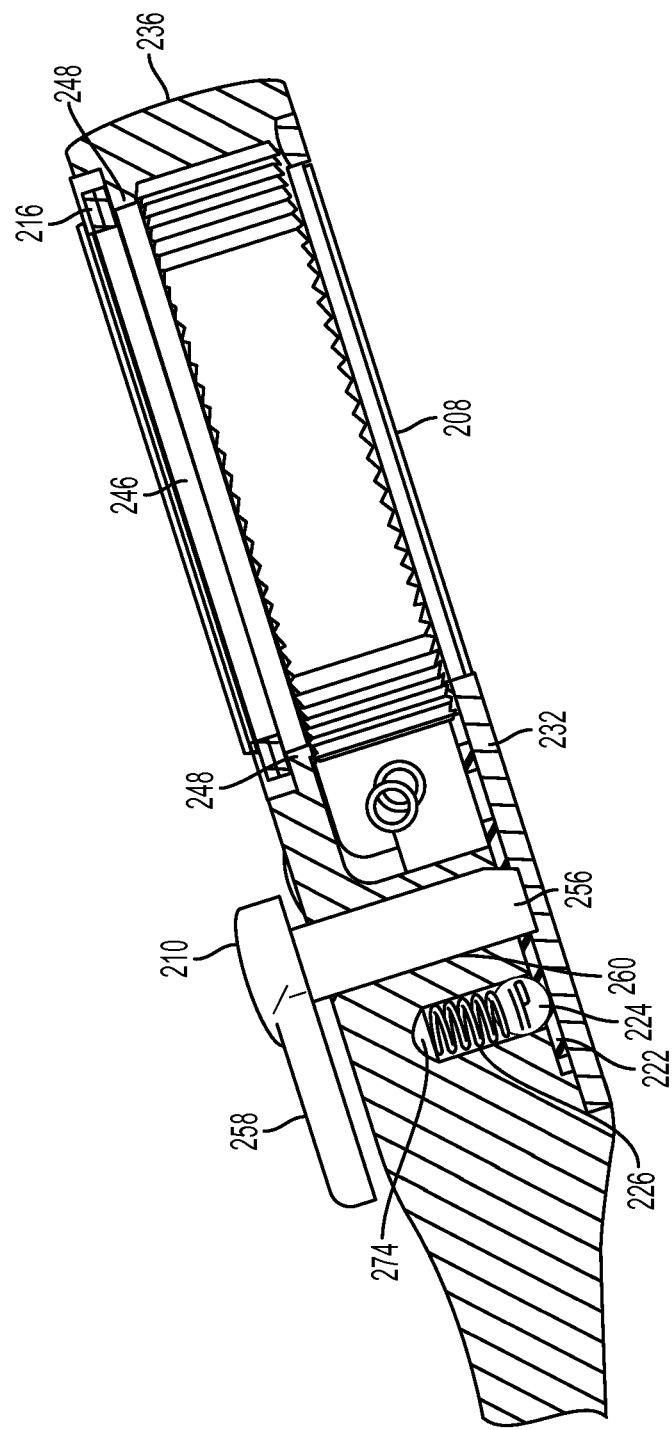
FIG. 9 is an enlarged, cross-sectional view of the ratchet wrench of FIG. 7 taken along line 9-9 of FIG. 7.

The ratchet gear 208 is substantially similar to the ratchet gear 108 described above. The ratchet gear 208 has a generally circular body portion with ratchet gearing or teeth 240 on an outer circumferential surface, and engagement surfaces 242 surrounding a receiving portion or receiving aperture 244 adapted to operatively engage a work piece. Referring to FIGS. 8 and 9, the ratchet gear 208 also includes a ring groove 246 adapted to receive the retaining ring 216. The ratchet gear 208 is disposed in the aperture 238, with the ring groove 246 extending past a retaining web or shoulder 248 in the aperture 238 and the ratchet gearing or teeth 240 remaining in the aperture 238. In this aspect, the retaining web 248 and retaining ring 216 cooperatively hold the ratchet gear 208 in the aperture 238.

As described above with reference to the tool 100, embodiments of tool 200 also solve the problems of traditional ratchet wrenches by trapping the ratchet gear 208 with the retaining web 248 and retaining ring 216 and preventing the ratchet gear 208 from applying a load to the cover plate 232 and fasteners 234 during use. The tool 200 also has improved fatigue strength and rigidity by orienting the pawls 218 and 220 to minimize a depth of one or more of the cavities in the head portion 236.

Figure 10:
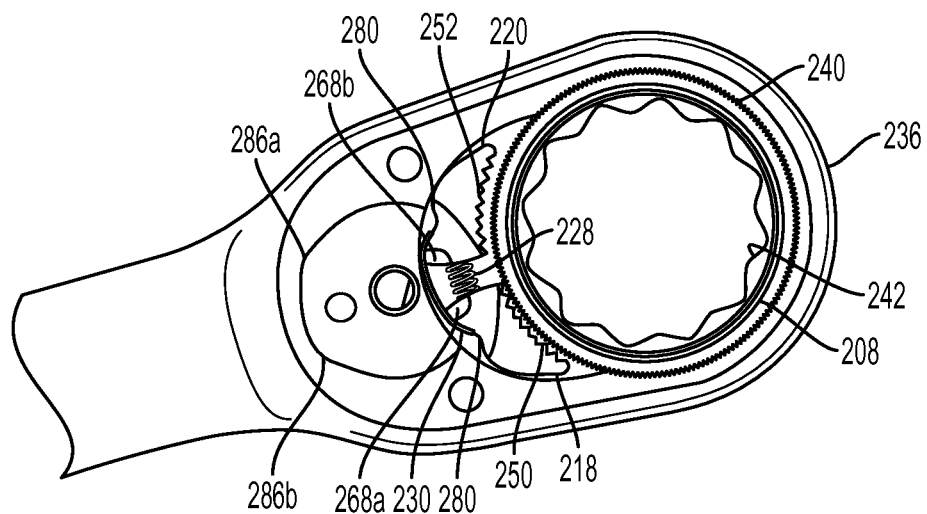
FIG. 10 is a first plan view of the ratchet wrench of FIG. 7, with a cover plate removed.

Referring to FIGS. 8 and 10, the pawls 218, 220 respectively include teeth 250, 252 adapted to matingly engage the ratchet gearing or teeth 240 of the ratchet gear 208 to allow torque to be applied to an engaged work piece in a selected direction. The pawls 218, 220 are disposed in a cavity 254 adjacent to and communicating with the aperture 238 to allow the pawls 218, 220 to selectively move into and out of engagement with the ratchet gearing or teeth 240 of the ratchet gear 208. A bias member, such as the first spring 228, is disposed between the pawls 218, 220. The ends of the first spring 228 are received and retained by a bore formed in a side of each pawl 218, 220, the respective bores of the pawls 218, 220 being in an opposed orientation to allow the first spring 228 to bias the pawls 218, 220 away from each other while also ensuring that only one of the pawls 218, 220 is in engagement with the ratchet gear 208 at a time.

Referring to FIGS. 8 and 9, the reversing lever 210 and reversing disc 222 allow for selective engagement and disengagement of the pawls 218, 220 with the ratchet gear 208. The reversing lever 210 includes a stem portion 256 and a lever portion 258. The stem portion 256 is received in a throughbore 260 provided in the head portion 236 with the lever portion 258 positioned on an outside of the head portion 236 for manual operation by a user to select a drive direction.

The reversing disc 222 is disposed in a cavity 264 and on the stem portion 256 extending into the cavity 264. As illustrated, the cavity 264 has a depth less than the cavity 254, and is adjacent to and communicates with the cavity 254 to allow the reversing disc 222 to interact with the pawls 218, 220. In an embodiment, referring to FIGS. 8 and 11, the reversing disc 222 has an irregular bore 266, and the stem portion 256 has at least a portion with a complementary shape. In this manner, when the stem portion 256 is received in the bore 266, it is keyed to the reversing disc 222 to allow the reversing lever 210 and the reversing disc 222 to co-rotate when the reversing lever 210 is moved between positions for selecting the drive direction.

Figure 12:
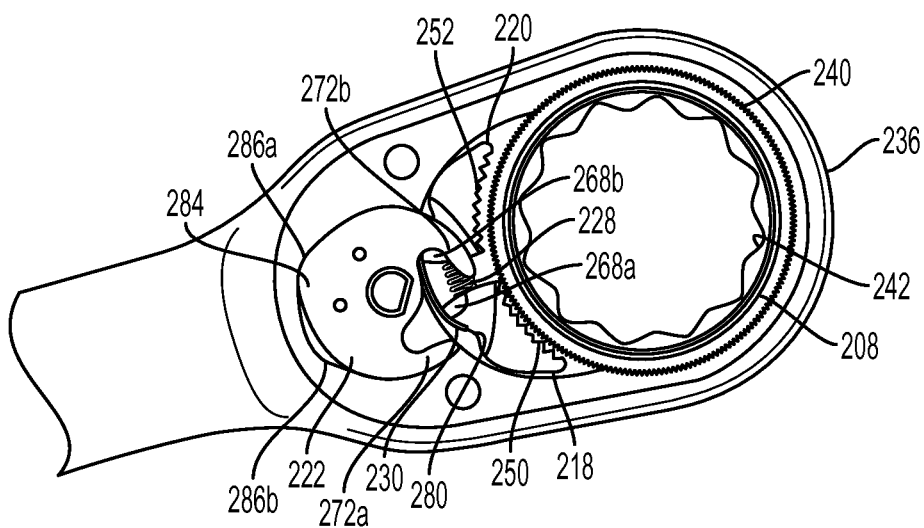
FIG. 12 is a second plan view of the ratchet wrench of FIG. 7, with the cover plate removed.

Referring to FIGS. 8, 10 and 12, the pawls 218, 222 respectively include posts 268a, 268b adapted to engage with the reversing disc 222. The posts 268a, 268b are proximate an opening of the cavity 254 and oriented to face in a direction of the cover plate 232 or bottom of the head portion 236. This allows the depth of the cavity 264 that receives the reversing disc 222 to be minimized; i.e., to be only deep enough to accommodate the reversing disc 222. As described above, this stiffens the head portion 236, improving the strength, rigidity, and the fatigue life of the tool 200.

Figure 11:
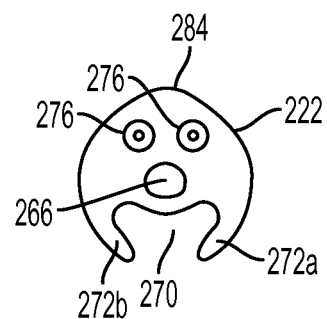
FIG. 11 is a plan view of a reversing lever disc of the ratchet wrench of FIG. 7 removed from the wrench for illustration purposes.

Referring to FIGS. 8 and 11, the reversing disc 222 includes an arcuate opening 270 defining disc hooks 272a and 272b adapted to respectively engage the posts 268a and 268b. Referring to FIG. 12, as the reversing disc 222 is shifted to one position for a selected drive direction, a first hook 272b engages a first post 268b of, for example, the pawl 220, and continued rotation of the reversing disc 222 draws the pawl 220 away from and out of engagement with the ratchet gear 208. At the same time, a second hook 272a allows the post 268a to move through the opening 270 so that the pawl 218 shifts and becomes engaged with the ratchet gear 208.

A bias member, such as a coil spring 228, biases the pawls 218, 220 away from each other and toward singular engagement with the ratchet gear 208. In this manner, when the reversing disc 222 engages a selector post 268a or 268b of one of the pawls 218, 220 to move the pawl, the spring 228 causes the other pawl to shift position. Additionally, the spring 228 allows the pawl 218, 220 engaged with the ratchet gear 208 to cam or deflect away from the ratchet gear 208 when a first drive direction is selected but the ratchet tool is rotated in reverse, in an opposite direction, to allow slippage or ratcheting in that direction. The spring 228 then forces the pawl 218, 220 to return to engagement with the ratchet gear 208 when the reverse movement ceases.

In an embodiment, referring to FIGS. 8 and 9, a ball and detent structure is provided to assist in holding the reversing disc 222 in place. In this embodiment, a blind bore 274 is located in the cavity 264. The spring 226 is disposed in the bore 274 and the ball 224 is disposed on the spring 226, proximate an opening of the bore 274. As illustrated in FIG. 11, the reversing disc 222 includes corresponding first and second detents or bores 276 on a side of the reversing disc 222 facing the cavity 264. The detents 276 are positioned to correspond to the proper position for the ball 224 when the reversing lever 210 is in the proper position for the first and second drive directions, respectively. Referring to FIG. 9, as the reversing lever 210 is rotated out of a position for a drive direction, the ball 224 contacts an edge of one of the detents 276, thereby being deflected downward by compression of the spring 226. When the reversing lever 210 is shifted to the proper position for a drive direction, the ball 224 shifts into alignment with one of the detents 276, and the spring 226 biases the ball 224 into the detent 276.

In this embodiment, referring to FIGS. 10 and 11, a stop mechanism is provided by structure formed on the reversing disc 222 and by the shape of the cavity 264 to prevent over rotation of the reversing disc 222. As illustrated in FIG. 11, the reversing disc 222 has a non-circular shape forming a tab portion 284 that extends from a radial side and, as illustrated in FIG. 10, the cavity 264 includes first and second stops 286a, 286b formed by the non-circular shape of the cavity 264. Referring to FIG. 12, rotation of the reversing disc 222 to a first position for a first drive direction results in the tab portion 284 contacting a first stop 286a, and rotation of the reversing disc 222 from the first position to a second position for a second drive direction results in the tab portion 284 shifting to a second stop 286b. The interaction between the stops 286a, 286b and the reversing disc 222 prevent over rotation of the reversing lever 210.

In an embodiment, the tool 200 also provides a means to limit pawl travel during ratcheting or use of the tool 100. Referring to FIGS. 8 and 10, the second spring 230 is disposed in the cavity 254 and in engagement with relief portions 280 of the pawls 218, 220. The second spring 230 biases the pawls 218, 220 in a direction toward the ratchet gear 208 and restricts travel of the pawls 218, 220 during a ratcheting operation. This also increases the minimum ratchet travel between loading.

Referring to FIG. 8, the tool 200 may be assembled by disposing the ratchet gear 208 in the aperture 238, with the ring groove 246 extending planarly beyond the retaining web 248. The retaining ring 216 is disposed in the ring groove 246 to hold the ratchet gear 208 in the aperture 238. The pawls 218, 220 are disposed in the cavity 254, with the respective teeth 250, 252 facing in a direction of the ratchet gear 208. The spring 228 is disposed between the pawls 218, 220 to bias the pawls 218, 220 apart. The second spring 230 is also disposed in the cavity 254 and engaged with the relief portions 280 of the pawls 218, 220 to limit pawl travel during ratcheting or use of the tool 200.

The reversing lever 210 is disposed in the throughbore 260, with the stem portion 256 extending into the cavity 264 and the lever portion 258 remaining on an exterior surface of the tool 200. The spring 226 and the ball 224 are inserted into the blind bore 274 in the cavity 264, with the ball 224 proximate the opening of the blind bore 274. The reversing disc 222 is then positioned in the cavity 264 on the stem portion 256, with a hook 272a or 272b around one of the pawl posts 268a or 268b and with the tab portion 284 (illustrated in FIG. 11) adjacent one of the stops 286a, 286b (illustrated in FIG. 10). The cover plate 232 is then coupled on the tool 200 by inserting the fasteners 234 into fastener apertures 282 and coupling the fasteners 234 to the cover plate 232.

As used herein, the terms "coupled," "coupling," and its functional equivalents are not intended to necessarily be limited to a direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and/or described, it will be apparent to those skilled in the art that changes and modifications may be made without departing from the broader aspects of the invention. The actual scope of the protection sought is intended to be defined in the following claims when viewed in their proper perspective.

What is claimed is:

1. A tool adapted to engage and provide a torque to a work piece and having a first end with opposing first and second sides, the tool comprising:
   an aperture disposed in the first end with an inwardly extending shoulder proximate to the first side;
   a ratchet gear including a receiving portion adapted to engage and provide the torque to the work piece, gear teeth and a ring groove circumferentially disposed on an external surface thereof, the ratchet gear is disposed in the aperture with the gear teeth and the ring groove respectively disposed on opposing sides of the shoulder;
   a retaining ring disposed in the ring groove and adapted to abut the shoulder to cooperatively retain the ratchet gear in the aperture;
   first and second pawls respectively having first and second pawl teeth that are selectively engageable and disengageable with the gear teeth;
   a reversing lever having a stem portion with a length and including a notch formed in the stem portion; and
   a reversing disc including a channel adapted to allow the reversing disc to slide perpendicular to the length of the stem portion and into the notch and rotate onto the stem portion, the reversing disc is adapted to cause the selective engagement and disengagement of the first and second pawl teeth with the gear teeth.

2. The tool of claim 1, further comprising a cover plate disposed on the second side of the first end, wherein the retaining ring is adapted to limit an amount of force applied to the cover plate by the ratchet gear when the torque is applied to the work piece during use of the tool.

3. The tool of claim 1, further comprising a first cavity in the first end and in communication with the aperture.

4. The tool of claim 3, wherein the first and second pawls are disposed in the first cavity.

5. The tool of claim 4, wherein each of the first and second pawls includes a relief portion on a side opposite the respective first and second pawl teeth.

6. The tool of claim 5, further comprising a spring disposed in the first cavity in engagement with the relief portions, the spring is adapted to limit movement of either one of the first and second pawl teeth away from the gear teeth when such pawl teeth is selectively engaged with the gear teeth.

7. The tool of claim 4, wherein each of the first and second pawls includes a selector post disposed proximate an opening of the first cavity.

8. The tool of claim 7, further comprising a second cavity in the first end in communication with the first cavity, the second cavity has a second cavity depth less than a first cavity depth of the first cavity.

9. The tool of claim 8, wherein the reversing disc is disposed in the second cavity and adapted to selectively engage one of the selector posts to cause selective engagement of one of the first and second pawl teeth with the gear teeth.

10. A tool adapted to engage and provide a torque to a work piece, comprising:
  an aperture;
  a shoulder extending into the aperture and having opposing first and second shoulder sides, wherein the first shoulder side faces inwardly relative to the aperture and the second shoulder side faces outwardly relative to the aperture;
  a ratchet gear disposed in the aperture and including:
    a substantially circular body portion having a receiving portion formed therein and adapted to engage the work piece;
    gear teeth circumferentially disposed on an outer surface of the body portion; and
    a ring groove circumferentially disposed on the outer surface proximate to an end of the body portion, wherein the ratchet gear is disposed in the aperture with the gear teeth disposed adjacent to the first shoulder side and the ring groove is disposed adjacent to the second shoulder side;
  first and second pawls respectively having first and second pawl teeth that are selectively engageable and disengageable with the gear teeth;
  a reversing lever having a stem portion having a length and including a notch formed in the stem portion; and
  a reversing disc including a channel adapted to allow the reversing disc to slide perpendicular to the length of the stem portion and into the notch and rotate onto the stem portion, the reversing disc is adapted to cause the selective engagement and disengagement of the first and second pawl teeth with the gear teeth.

11. The tool of claim 10, further comprising a retaining ring disposed in the ring groove and adapted to abut the second shoulder side to cooperatively retain the ratchet gear in the aperture.

12. The tool of claim 10, wherein each of the first and second pawls includes a relief portion on a side opposite the respective first and second pawl teeth.

13. The tool of claim 12, further comprising a spring disposed in engagement with the relief portions, the spring is adapted to limit movement of either one of the first and second pawl teeth away from the gear teeth when such first or second pawl teeth is selectively engaged with the gear teeth.

14. The tool of claim 10, wherein the reversing lever is adapted to rotate the reversing disc to cause the selective engagement and disengagement of the first and second pawl teeth with the gear teeth.

15. A ratcheting tool adapted to engage and provide a torque to a work piece, comprising:
  an aperture including a shoulder extending inwardly therein;
  a first cavity adjacent to and communicating with the aperture;
  a second cavity adjacent to and communicating with the first cavity;
  a throughbore in the second cavity;
  a ratchet gear including a receiving portion adapted to engage and provide the torque to the work piece, gear teeth and a ring groove circumferentially disposed on an outer surface thereof, the ratchet gear is disposed in the aperture with the gear teeth and the ring groove respectively disposed on opposing sides of the shoulder;
  a retaining ring disposed in the ring groove and adapted to abut the shoulder to cooperatively retain the ratchet gear in the aperture;
  first and second pawls each including a pawl post and respectively including first and second pawl teeth, the first and second pawls are disposed in the first cavity so the respective first and second pawl teeth can selectively engage the gear teeth;
  a first spring disposed between the first and second pawls and adapted to bias the first and second pawls away from each other;
  a second spring disposed in the first cavity and engaged with relief portions of the first and second pawls, the second spring is adapted to limit movement of either one of the first and second pawl teeth away from the gear teeth when such first or second pawl teeth is in selective engagement with the gear teeth;
  a reversing lever having a stem portion with an length and including a notch formed in the stem portion, the stem portion is disposed in the throughbore and extends into the second cavity for causing the selective engagement of the first and second pawl teeth with the gear teeth; and
  a reversing disc including a channel adapted to allow the reversing disc to slide perpendicular to the length of the stem portion and into the notch and rotate onto the stem portion, the reversing disc includes hook portions adapted to engage the pawl posts, the reversing lever is adapted to rotate the reversing disc to select one of first and second rotational drive directions, wherein when the first rotational drive direction is selected, the reversing disc engages the post of the first pawl to cause disengagement of the first pawl teeth with the gear teeth and engagement of the second pawl teeth with the gear teeth, and when the second rotational drive direction is selected, the reversing disc engages the post of the second pawl teeth to cause disengagement of the second pawl teeth with the gear teeth and engagement of the first pawl teeth with the gear teeth.

* * * * *